United States Patent [19]

Makow

[11] Patent Number: 5,122,890
[45] Date of Patent: Jun. 16, 1992

[54] ELECTRO-OPTIC ANIMATED DISPLAYS AND INDICATORS EMPLOYING ELECTRO-OPTICAL CELLS AND MOSAIC SEGMENT POLARIZER

[76] Inventor: David M. Makow, 14 Davidson Crescent, Gloucester, Ontario, Canada, K1J 6M2

[21] Appl. No.: 619,128

[22] Filed: Nov. 23, 1990

Related U.S. Application Data

[63] Continuation-in-part of Ser. No. 165,822, Mar. 9, 1988, Pat. No. 5,020,882.

[30] Foreign Application Priority Data

Nov. 6, 1987 [CA] Canada ................................ 551216

[51] Int. Cl.⁵ .......................... G02F 1/13; B44F 1/10; G09F 13/10
[52] U.S. Cl. ........................ 359/63; 359/53; 359/64; 359/70; 359/73; 40/427
[58] Field of Search ............. 350/335, 337, 339 F, 350/345, 347 E, 347 R; 359/36, 63, 70, 71, 73, 53, 437, 489, 494; 40/434, 436, 437, 442, 448

[56] References Cited

U.S. PATENT DOCUMENTS

| | | | |
|---|---|---|---|
| 3,054,204 | 9/1962 | Yates | 40/434 |
| 3,437,401 | 4/1969 | Siksai | 40/434 |
| 3,597,043 | 8/1971 | Dreyer | 359/82 |
| 3,806,227 | 4/1974 | Greubel et al. | 359/82 |
| 4,025,164 | 5/1977 | Doriguzzi et al. | 350/337 |
| 4,068,926 | 1/1978 | Nakamura et al. | 350/337 |
| 4,232,948 | 11/1980 | Shanks | 350/347 R |
| 4,239,349 | 12/1980 | Scheffer | 350/347 R |
| 4,416,514 | 11/1983 | Plummer | 350/335 |
| 4,423,928 | 1/1984 | Laesser | 350/335 |
| 4,610,507 | 9/1986 | Kamamori et al. | 350/335 |
| 4,770,500 | 9/1988 | Kalmanash et al. | 350/335 |

FOREIGN PATENT DOCUMENTS

| | | |
|---|---|---|
| 2748066 | 5/1978 | Fed. Rep. of Germany . |
| 2331857 | 6/1977 | France . |
| 58-120220 | 7/1983 | Japan . |
| 60-211420 | 10/1985 | Japan . |

Primary Examiner—Stanley D. Miller
Assistant Examiner—Tai V. Duong

[57] ABSTRACT

In this invention, animation effects have been obtained in a device containing a light source illuminating a linear polarizer (3) producing plane polarized light which is rotated in an electro-optical cell/cells (2) such as a modified TN or STN Liquid Crystal or PLZT cell. The angle of the plane is changed at the required speed by a voltage applied to the electrodes (6) of the cell; this voltage being generated in an electronic circuit (8) or obtained from the output of transducer or a manual voltage controller. The rotated plane polarized light is shining through a stationary set of at least two linear polarizers (1) placed side by side and oriented at different angles and then through a screen containing the art work (7). The emerging lighted image is perceived by the viewer (5) as a change or as an animated movement of the art work. Color effects can also be obtained when a seocnd electro-optical cell with a chromatic polarizer is used in a serial arrangement with the above device. In the prior art, the change of the angle of the plane polarized light was achieved by mounting the linear polarizer on a mechanically rotated wheel. The introduction of electro-optical voltage controlled cells has many advantages such as in the speed of response, reduction of weight and power consumption, feasibility of new effects, flexibility of design and elimination of moving parts. The applications of this invention are in advertising and exhibition displays, animated signage, animated printed material, instrument readout indicators and monitors, works of art, and in the field of toys and games.

19 Claims, 3 Drawing Sheets

ELECTRO-OPTIC ANIMATED DISPLAYS AND INDICATORS EMPLOYING ELECTRO-OPTICAL CELLS AND MOSAIC SEGMENT POLARIZER

RELATED APPLICATION DATA

The present invention is a continuation-in-part to application Ser. No. 07/165,822 filed on Mar. 9, 1988, U.S. Pat. No. 5,020,882. This application is incorporated herein by reference.

BACKGROUND OF THE INVENTION

1) Field of the Invention

This invention relates to animated displays used in advertising, merchandising, instructional and educational fields. It is related to displays using light polarisation effects in order to illustrate movement of various objects, flow of liquids or flow of energy in systems that are graphically or artistically depicted on a backlighted or frontlighted screen or are projected on a separate screen. The animation effects can include linear, curved, wavelike, rotational, pulsating, accelerating, decelarating, blinking and the like effects and the effects can be limited to the parts on the display screen to be animated. This invention also relates to means of selectively illuminating limited areas on a dark screen such as used, for example, in indicators, signals and advertising panels. Information in forms of pictures, artwork symbols, letters, alphanumerics that is fixed or changed as a function of a measured quantity can form a part of an animated display or form a separate display device such as an indicator, meter or monitor of any physical quantity that may or may not include an animated arrow or other picture to draw attention. This invention also relates to colored displays animated and/or stationary in which the color or color change is obtained through the interaction of polarised light with a chromatic polariser.

2) Description of Prior Art

The now commercially available polarising mosaic is defined next for the purpose of describing and claiming the invention. The preferred definition is an assembly of achromatic or chromatic linear polariser segments having different angles of polarisation placed side by side that forms one sheet by suitable bonding techniques. In an alternative form known in the art and commercially available, as disclosed in the book by W. A. Shurcliffe entitled: "Polarised Light", Harvard University, 1962 and in the patent by Siksal such segments can be embossed on a plastic sheet, thus modifying the birefringence, dichroism or chromaticity of these sheets, which, when bonded to another polariser sheet fulfills the same function with the same results as the assembly of polariser segments.

In the prior art animated displays of the type outlined in the foregoing have been generally characterised by the presence of a a lights source, a rotable polariser, manually or motor driven and a polarising mosaic as defined above. One such display device is disclosed in the patent by Yates and another, which might be considered an improvement on the former, is disclosed in the patent to A. Siksal, cited. Both show a motor driven polariser disc being an integral and necessary part of the system. In the prior art devices capable of selectively illuminating parts of a dark screen, using the light polarisation phenomena applied to indicators or advertising panels, also relied on rotating parts as disclosed for example in the patent to Dreyer. In the prior art production of animated color effects or selectively illuminated colored parts on the viewing screen has been obtained by placing suitably oriented and shaped birefringent or dichroic plastic material between two polarisers (the second being often referred as the analyser), one of them being usually a motor driven polariser disc. An example of such a display is disclosed in the patent to Burchell.

The presence of mechanical often motor driven parts in the prior art displays and indicators discussed in the foregoing gives rise to a number of undesirable side effects. In addition to wear and tear, that calls for regular maintenance, it is necessary to control some noise, vibration and heat generation due to the operation of an electric motor. Also, since a rotating disc is usually circular in shape and the display panel usually square or rectangular, a common problem arising is that of illuminating the corners and edges of the panel with rotating polarised light. Additional pulleys and discs have to be provided for the corners; they do not solve the problem completely and add to the complexity of the design. Although the speed of the motor is controllable, it cannot be changed quickly enough to produce certain desired animation effects. The range of possible animation effects could be greatly enlarged and the process could be simplified were it possible to animate individually the desired portions of the display. However the speed of the motor in such displays often determines the rate of change of the animation effects throughout the whole display panel. The above mentioned limitations of prior art devices can be overcome and a number of advantages and new animation effects can be realised by the present invention. They will be explained in the parts of the specifications to follow.

SUMMARY OF THE INVENTION

I have found that certain recently perfected electro-optic devices offer a practical solution for the elimination of the mechanical elements in animated display panels and in indicators and can be also adapted to produce color effects. It has been known for a long time that certain solids, liquids and gases rotate the plane of polarisation when subjected to high electric or magnetic fields. The electro-optical effects have been known as the Kerr and Pockels effect and the magneto-optical effects have been known as the Cotton-Moutton and the Faraday Effect. Unfortunately the devices based on these effects were usually bulky, required high electric or magnetic fields and were generally not practical for use in display panels. It was only during the last ten years that concentrated R and D effort all over the world led to inexpensive, thin, transparent devices capable of rotating the plane of polarisation, which are suitable for flat display panels. These devices will be referred to in the following as polarotator cells. they are well summarised in the book "Flat-Panel Displays and CRT's" by E. Lawrence and Tannas Jr., Van Nostrand Reinhold Co. New York, 1985.

Of the possible electro-optical devices capable of rotating the plane of polarisation it has been found that a suitably modified Twisted Nematic, (TN), or Supertwisted Nematic, (STN), Liquid Crystal cell and PLZT Ferroelectric Ceramic cell both being transparent, were very suitable for use is such displays. A thin film iron-garnet cell might be also suitable. To date such cells have been used mostly in watches, computer and instrument displays. They operate in a mode in which the angle of the plane of linearly polarised light is being switched from zero to 90 degrees or more and back with the transition period between the two angles being very short. Although not widely known and explained in the literature on the subject, any angle can be obtained and maintained between the zero and the maximum angle and that the angle can be changed and controlled by the voltage applied to the electrodes of these cells. This effect has been reported by M. Schadt and W. Heifrich in Applied Physics Letters Vol. 18, No. 4, p.p. 127-8, Feb. 15, 1971. It has been found that most animation effects that were obtained with a mechanically rotating polariser disc can be also obtained by placing such cells over the areas or details of the panel design to be animated in conjunction with a polarising mosaic. In cases where a 360 degree rotation of the polarisation plane is required, to depict for example the rotational movement of a wheel, an assembly of two to four such cells or a single TN or STN cell energised by a suitably shaped voltage can accomplish this task as will be explained in greater detail in the following.

It will be apparent to a person skilled in the art that all of the previously mentioned drawbacks of mechanical elements will be eliminated using such electro-optical devices. In addition, distinct advantages will become apparent such as complete freedom with regard to the placement of the animated details on the panel, including the corners and edges. Each detail could be animated from a separate electronic circuit at its own rate and speed or can be stationary or slowly changing to supply information only. Thus new effects and effect distribution and control, until now not possible, can be realised by such electro-optical means. These and other desirable objects and properties of the invention will become evident to a person skilled in the art as they are discussed in the following specification.

BRIEF DESCRIPTION OF THE DRAWINGS

The drawings which illustrate the principles of the embodiments of the invention, may be modified and changed as regards the immediate illustration, all within the true intent and scope of the invention, hereinafter defined and claimed.

The above shown embodiments of the invention and its details basically involve the combination of a liquid crystal, PLZT ceramic, thin film iron garnet cell or other suitable polarotator cell and a polarising mosaic to produce an animated movement or flow effect or to produce a selectively illuminated indicator effect. The various forms of the polarising mosaic shown in FIGS. 2, 3, 4, 5, 6 and 7 and many other forms are well known in the art are described in detail in the patents by D. M. Yates and A. Siksal cited, and are available commercially, for example from Polaroid, and Frank Woolley Co. Inc. They have been shown here in order to assist in the description of the invention. The liquid crystal and PLZT polarotator cells are also well known in the art. They have been perfected recently and are available commercially for example from the Crystaloid, UCE and Motorola Company respectively. The combination of the electronic voltage waveform generator circuit, the polarotator cells and polarising mosaic is believed to be novel and it results in an improved and simplified animated display device. The operation of such a device and some of its possible variations and modifications will now be described in greater detail.

DESCRIPTION OF THE PREFERRED EMBODIMENTS

Figure 1:
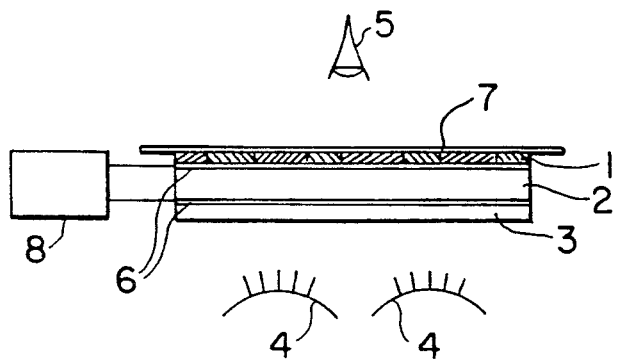
FIG. 1 is one embodiment of the invention for an animated or indicator display, showing diagramatically a cross section of such a display, in which the location of the polariser and polarising mosaic could be interchanged.
Figure 2:
FIG. 2 shows the plane view of the functional structure of a polarising mosaic to produce the impression of a linear movement or flow.
Figure 3:
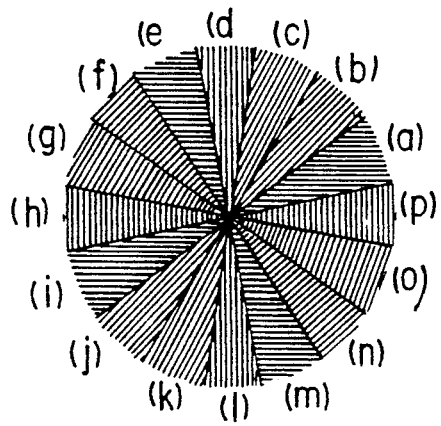
FIG. 3 shows a plane view of a polarising mosaic to produce a rotary spoke wheel effect.
Figure 4:
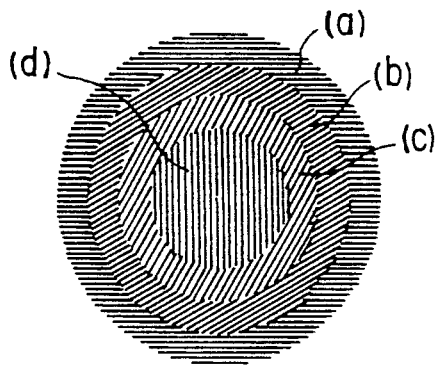
FIG. 4 shows a plane view of a polarising mosaic to produce a bull eye effect of radially expanding or contracting form.
Figure 5:
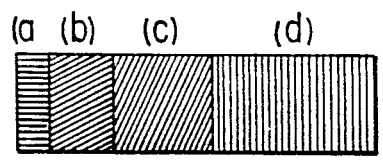
FIG. 5 shows a plane view of a polarising mosaic to produce an accelerating motion effect.
Figure 6:
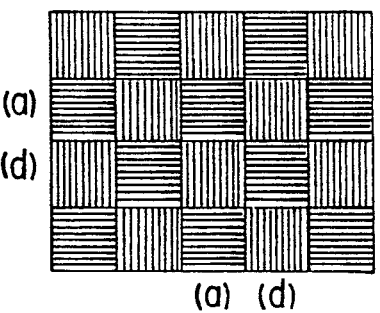
FIG. 6 shows a plane view of a polarising mosaic to produce a checker board effect.
Figure 7:
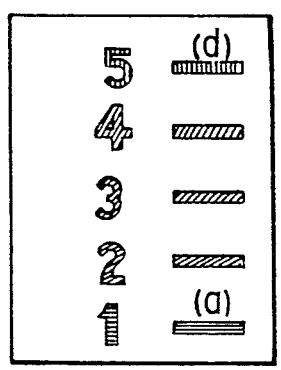
FIG. 7 shows a plane view of a polarising mosaic in an embodiment for an indicator where the polarising mosaic has the shape of numbers and pointers.
Figure 8:
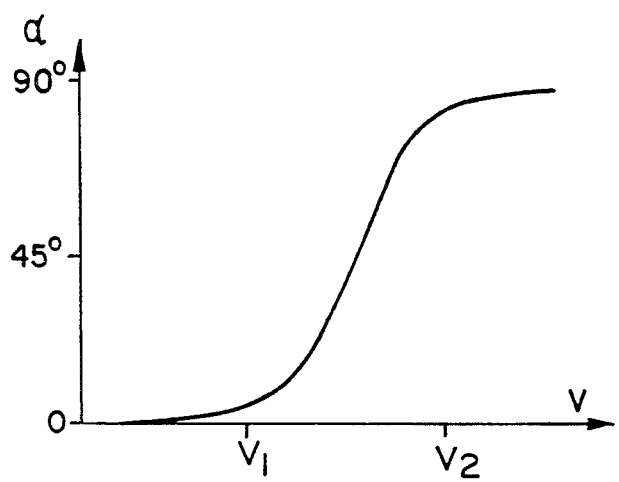
FIG. 8 shows typical relationship between the angle α of rotation of the plane of polarisation of a polarotator cell and the voltage V applied to its electrodes.
Figure 9:
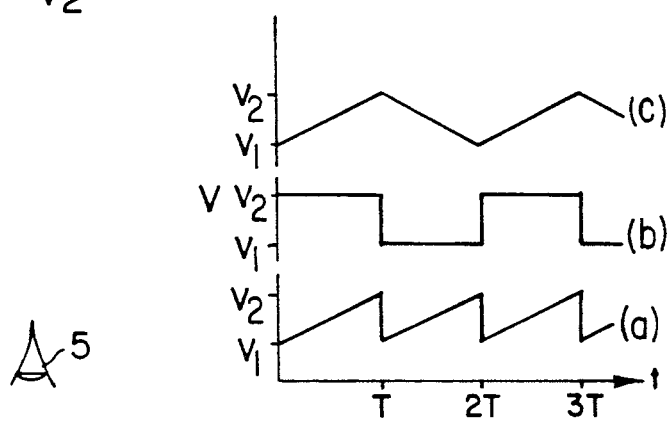
FIG. 9 shows examples of waveforms of the voltage applied to the electrodes of the polarotator cell in order to produce an animated effect.

The basic embodiment of the invention is shown diagramatically in FIG. 1. Refinements of design which might be required, such as for example an enclosure, a protective plastic or glass, light directing or modifying means such like lenses or light diffusers or absorbers and the like, will be evident to people skilled in the art and they are not shown for the sake of clarity. The embodiment consists of a uniform suitable incandescent, flourescent electroluminescent or natural light source (4) with or without a light diffuser, the light source being plane polarised in the linear polariser (3) and the angle of the plane being rotated in the symbolically shown polarotator cell (2) by an angle which depends on the voltage generated in an electronic circuit, transducer or manually controlled using for example a variac or potentiometer (8) and applied to the transparent electrodes (6) deposited on or attached to the interior walls of the cell containing the electro-optic material. The cell could be preferably a Twisted or Supertwisted Nematic Liquid Crystal cell or a PLZT Ferroelectric Ceramic shutter cell, having the top and bottom polariser removed. The glass or plastic transparent image screen (7), with a picture artwork, graphics or alphanumerics being applied suitably on it, is placed on the cell. The polarising mosaic (1) as defined in the foregoing may be bonded by suitable means to at least part of the inside of the image screen, over those portions of the picture details only which have to be animated. It is noted that the location at the polariser and the polarising mosaic could be interchanged to obtain the same result. The picture is being seen by the observer (5) from above or from the side if the device is placed vertically. The configuration as described together with the light source is enclosed in a suitable box designed to be either stationary or portable or equipped if required with means to interchange the image screen with the polarising mosaic bonded onto it. Referring to FIG. 2 observe the vertical strips (a), (b), (c), (d), of the polariser mosaic segments sequentially assembled at progressively increasing polarising angles, side by side and repeating the same angular sequence in the strips (e), (f), (g), (h) and the strips (i), (j), (k), (l). Depending on the angle of the plane of polarised light emerging from the polarotator cell and passing through the polarising mosaic, the strips having the same angle will transmit the light and those at 90 degrees to the angle of the plane will block the light. Strips that are oriented at intermediate angles will show progressively darkening shades of gray. The corresponding details of the picture on the image screen will exhibit then the same light distribution. FIG. 8 shows the shape of the curve describing the relationship between the angle $\alpha$ of rotation of the plane of polarisation emerging from the polarotator cell and the voltage applied to its electrodes. Note, that at voltage $V_1$ the angle is almost zero and at the voltage $V_2$ almost 90 degrees. The typical voltages for the Twisted Nematic and the PLZT cells are approximately $V_1=3$ volts and 110 volts and $V_2=5.5$ volts and 160 volts respectively. If one arranges for example the angles of the strips a and d, e and h and i and L in FIG. 2 to differ by 90 degrees, the strips (a), (e) and (i) will light up at the voltage $V_1$, the strips (d), (h) and (L) at the voltage $V_2$ and the other strips will light up at the voltages between. The voltage could be made to vary in a sawtooth manner between $V_1$ and $V_2$ as shown in FIG. 9a, using well known electronic circuit techniques. Then as the voltage increases from $V_1$ towards $V_2$ successive strips will be illuminated creating the impression of a wave-like movement of shades of light from the (a) to the (d), (e) to (h) and (i) to the (L) strip. As these strips are attached to the image screens the corresponding movement of the picture detail, for example the flow of fluid will be seen. The return from the voltage $V_2$ back to $V_1$ is designed to be very fast so that the successive cycles merge together to create a continous movement. The speed of the movement, determined by the period T can be controlled electronically over a wide range. A variety of wave forms, other than saw-tooth, such as square, and triangular shown in FIGS. 9b and 9c and many other waveforms can be easily generated using electronic circuits well known to the art. Then a corresponding variety of animation effects can be obtained. For example the triangular waveform with the mosaic shown in FIG. 2 will give rise to a linear pulsating movement. In addition, depending on the sequence, the placement and the size of the segments other effects can be realised as illustrated in FIG. 3 to FIG. 7. Using the saw-tooth waveform, examination of the polarising mosaic of FIG. 3 reveals to a person skilled in the art that a rotary spoke-wheel effect will be obtained with such segment assembly, that of FIG. 4 will give a radially moving motion, that of FIG. 5 an accelerating movement effect, and that of FIG. 6 an alternating blinking checkerboard effect. Other effects can be obtained using other waveforms.

Figure 10:
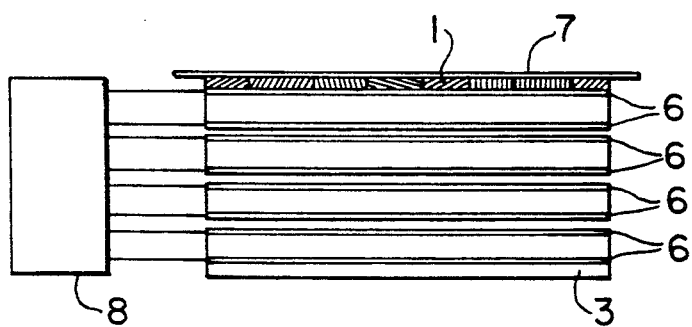
FIG. 10 shows a cross section of an example of a device consisting of up to four polarotator cells to produce up to 360 degree rotation of the plane of polarisation.
Figure 10:
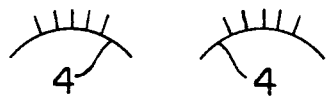
Figure 11:
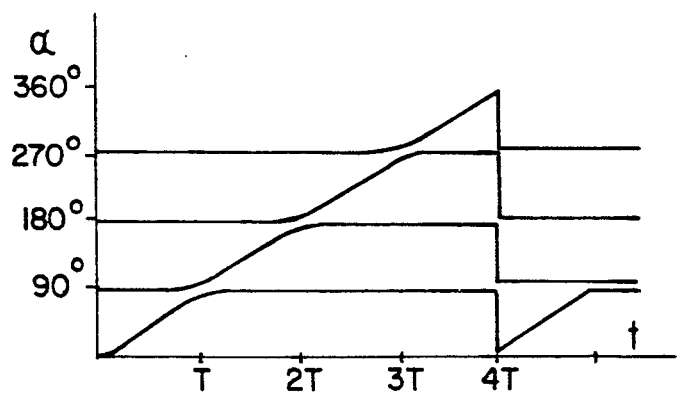
FIG. 11 shows the initial angular alignment and the change of the polarisation angle α as a function of time of the four cells in FIG. 10 when connected in series.

Polarotator cells as described permit a rotation of the plane of polarisation by almost 90 degrees. Recently, supertwisted nematic, (STN), or double layer supertwisted, (DSTN) or film compensated supertwisted nematic cells have been shown to rotate the plane of polarisation by up to 270 and more degrees. The latter two types have improved contrast and better angle of viewing. Although the majority of animation effects can be accomplished with a single cell and using suitably shaped voltages there may be situations where a specific effect requires a rotation of 180, 270 or 360 degrees. A further embodiment of the invention accomplishes this using one suitably designed supertwisted nematic cell capable to rotate the angle of polarisation by 360 degrees or using two supertwisted nematic liquid crystal cells each rotating for example by 180 degrees for a total of 360 degrees. Alternately two, three or four polarotator TN cells rotating by 90 degrees each are assembled in the same optical path, one behind the other as shown in FIG. 10 and the cells can be connected in parallel to be excited from the same sawtooth voltage source. When these cells are connected in series each successive cell is turned first by 90 degrees using suitable alignment techniques known to the art and the voltage waveforms are shaped to rotate the angle $\alpha$ of the plane of polarisation in each cell to produce an angle-time relationship shown in FIG. 11. The numbers in FIG. 10 indicate the same components as the same numbers in FIG. 1. The electronic circuit, transducer or manual voltage controller (8) is designed to provide two, three or four outputs of suitably shaped voltages. The spacings between the four cells are shown for the sake of clarity and can be eliminated providing a proper transparent insulation. Further simplification in construction can be obtained by combining the two adjacent walls of each two neighboring cells into a single wall spacer. Thus for example in the case of Liquid Crystal cell such single glass spacer wall will be coated on both sides with transparent electrode material.

A further embodiment of the invention relates to stationary or changing patterns such as used in indicators or meters of a physical quantity being measured or monitored. They can be also obtained using the configurations described in the foregoing. In FIG. 7 an example of an indicator is shown where the indicia were cut out of a polarising sheet and placed at progressively increasing polarisation angles for the series of numbers. A number will light up for a given measured quantity since the angle is related to the voltage which in turn is related to the measured or monitored quantity using transducers well known in the art. This configuration represents a very inexpensive method to construct a monitor or meter display or an indicator. An animated errow or picture could be added to such an indicator to point or to draw attention to a range of numbers perhaps also representing for example a zone of danger. The pointer can be a radial line and the numbers places on the circumference of a circle. It will be evident to a person skilled in the art that a large variety of display devices can be constructed, based on the above principles. Such devices would also include toys and games where the voltage is obtained from a transducer or a manually operated voltage controller, such as a potentiometer or variac.

Figure 12:
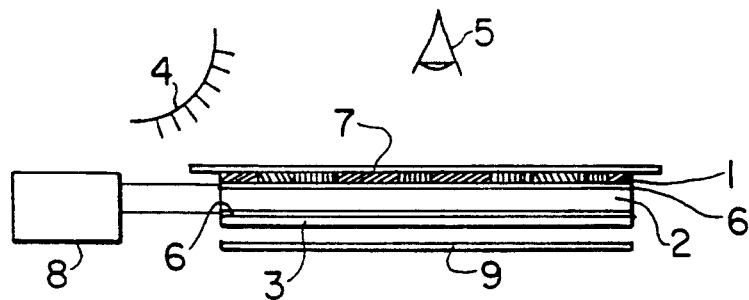
FIG. 12 shows an embodiment of the invention shown in FIG. 1 in an adaptation for viewing in reflected light.
Figure 13:
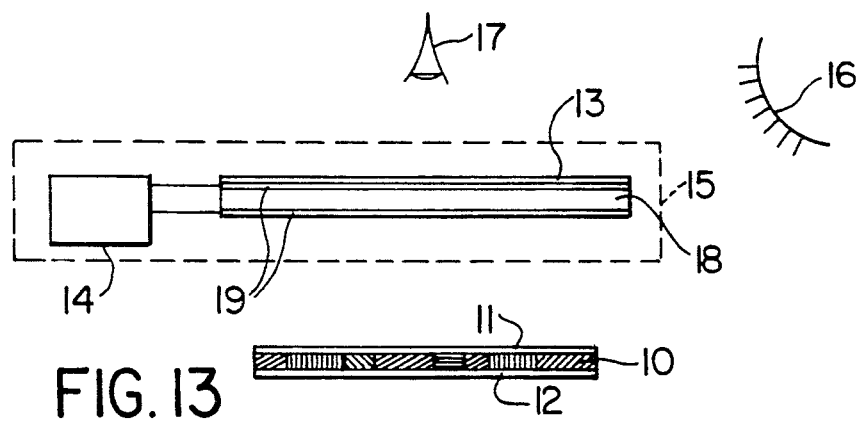
FIG. 13 shows an embodiment of the invention shown in FIG. 1 in an embodiment for viewing and animating an illustration on a page.

FIG. 12 shows the embodiment of the invention when the light source (4) is on the side of the observer (5) and an opaque or semi-transparent reflector (9) which may also comprise means to enhance, spectrally modify or diffuse the incident light such as a suitably treated or fluorescent or colored metal foil is placed below the polariser (3) replacing or complementing the light source (4) in FIG. 1. All the effects described in the foregoing can be then observed in reflection with or without some backlighting. This is because polarisation of light is not lost as a result of reflection. This mode of operation might be advantageous in certain situations such as when viewing in daylight and in suitably illuminated rooms or when it is preferable to illuminate the panel from the outside. A still further embodiment of the invention in the reflection viewing mode relates to animating an illustration or a picture of a printed page such as in an educational book and is shown in FIG. 13. The picture to be animated is printed or coated on a transparent screen (11) made of plastic or glass. The polarising mosaic (10) is bonded to the screen and to the reflecting page (12). The observer (17) is looking through a device shaped to be placed over the eyes or shaped as a hand held device (15) which contains the polarotator cell (18), with its transparent electrodes (19) and the attached polariser (13) and a miniature electronic circuit transducer or manual voltage controller (14) energising the cell (18). Such a device is illuminated either from daylight or artificial light source (16) which can be separate or attached to the device. Note that such a device is separated from the picture carrying page and is placed away from it at a distance found most suitable for viewing under the given light conditions. The electronic circuit can generate several waveforms that are selected for the type of animations required for the picture being viewed.

In a still further embodiment of the invention shown in FIG. 1 simple modifications permit large scale projection of the animated picture. The source of light (4) is replaced by projection lamps to permit projection on a large screen for mass audience viewing. Means are provided to enable easy interchanging or replacement of the picture screen (7) having the polarising mosaic segments (1) bonded to the details of the picture to be animated.

Figure 14:
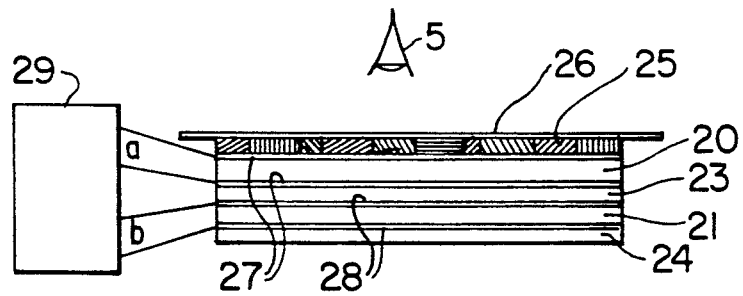
FIG. 14 shows an embodiment of the invention to produce independently controlled animation and color effects using two polarotator cells and a chromatic polariser.

In an extension of the basic embodiment of the invention two or more polarotator cells are used in combination with chromatic, sometimes referred to as spectral polariser or in combination with a chromatic linear retarder, well known in the art (see book by W. A. Shurcliffe, cited) which are commerically available. This permits independent and separate production and control of color effects and animation effects. In FIG. 14 the upper portion of such an embodiment produces the animation effects and consists of the picture carrying screen (26) polarising mosaic (25), polarotator cell (20) with its transparent electrodes (27), energised and controlled from the output (a) of the electronic circuit transducer or manual voltage controller (29). This upper portion receives plane polarised colored light from the chromatic or spectral polariser (23) but its function is identical to the basic embodiment shown in FIG. 1. The chromatic polariser (23) may represent a dyed linear polariser which absorbs a part of the visible spectrum and thus produces colored light in transmission. In such a case the change of angle of the plane of polarised achromatic light entering such polariser from the second polarotator cell (21), with its transparent coated electrodes 28, and linear polariser (24) changes the saturation of the transmitted colored light. The degree of saturation can be controlled electronically from the output (b) of the electronic circuit transducer or manual voltage controller (29). The chromatic polariser may also consist, of two commercially available, dyed linear polarisers, say one passing blue light and the other red light, bonded together with their polarisation axis at 90 degrees to each other and forming one sheet. In such a case the change of angle of the plane of polarised achromatic light entering this polariser from the polarotator cell (21) oriented at 45 degrees to the axis of the former changes the hue. The hue of the colored light can be thus controlled from the output (b) of the electronic circuit transducer or manual voltage controller (29). The source of light (4) on the opposite side of the display from the viewer (5).

Figure 15:
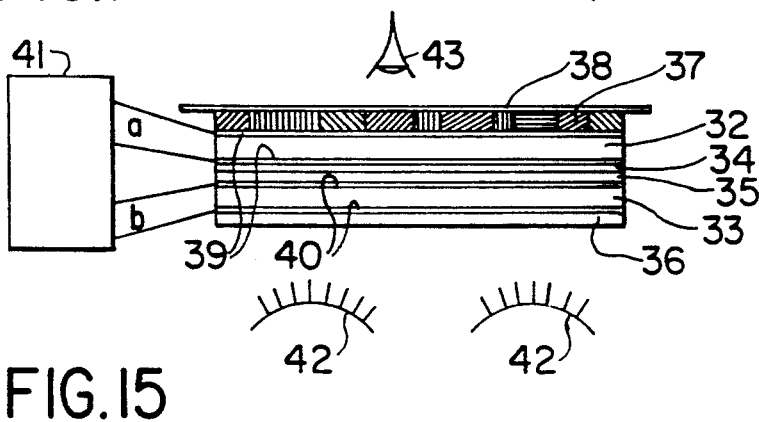
FIG. 15 shows an embodiment of the invention as in FIG. 14 but using a chromatic linear retarder.

In FIG. 15 independent control of animation effects and control of hue of the emerging colored light can be obtained in a similar manner as in FIG. 14. However change of hue is obtained from the interaction of the linear polariser (34) and the chromatic linear retarder (35) with the change of angle of the plane polarised achromatic light as it emerges from the polarotator cell (33); the latter having the coated transparent electrodes (40) and an attached linear polariser (36). The output (a) of the electronic circuit transducer or manual voltage controller (41) controls the animation effects as in the basic embodiment of FIG. 1, and the output (b) controls thus the hue of the emerging colored light. The remaining parts (42), (32), (37), (38) and (43) are similar to the corresponding parts in FIG. 14 explained before. A further method of controlling the colour of the emerging light is by substituting the chromatic linear retarder by one or more layers of a birefringement film (such as polyvinyl alcohol film or cellulose film or polyvinyl fluoride film). It will be appreciated that a serial assembly of the arrangements described in the foregoing to control either the saturation or hue of the colour will result in the control of both. Also it will be appreciated that the location of the polarising mosaic and the chromatic polariser together with their respective polarator cells can be interchanged to obtain similar results.

It is evident to a person skilled in the art that the embodiments shown in FIG. 14 and FIG. 15 can be adapted to viewing an illustration on a page or to viewing in reflected light or in the application as an indicator following the principles shown in FIG. 13, FIG. 12 and FIG. 7 respectively.

While the preferred embodiments of the inventions have been explained and illustrated it will be appreciated that the invention is not restricted to these specific forms but it may consist of further embodiments and is of broader scope as defined in the claims.

The embodiments of the invention in which an exclusive property or privilege is claimed are defined as follows:

1. A display device comprising
   i) a light source, if required
   ii) a linear polariser for plane polarising light from said source;
   iii) at least one electro-optical cell capable of changing the angle of the plane of polarisation of polarised light emerging from said polariser to any value within the angle range;

iv) at least one layer mosaic of light polarising means consisting of at least two parts, each part oriented in a different direction of polarisation, located to be illuminated by polarised light emerging from said electro-optical cell;

v) a transparent protective or viewing screen carrying information selected from a group consisting of images, alphanumeric characters, indicia, art work or graphics located to be illuminated by said light source directly or from said cell and said mosaic; said cell and said mosaic illuminating at least a part of said screen;

vi) means of generating a voltage or special voltage waveforms for changing and controlling the angle of polarisation of at least one said cell (iii), and thereby also controlling the pattern of light emerging from said mosaic (iv), in order to achieve the desired animation effect, said voltage applied to said at least one cell by means of transparent electrodes spread across and covering at least a part of some of the surfaces of said cell.

2. A display device as described in claim 1, wherein said linear polariser, said cell, said mosaic, said screen, is a thin layer with an exterior surface facing toward a viewer, when the device is in its operative position, and an interior surface facing away from a viewer when said device is in its operative position.

3. A display device as described in claim 2, further comprising an opaque or semi-transparent light reflector for reflecting, enhancing, spectrally modifying or diffusing the incident light, said reflector having a reflecting exterior surface facing towards the viewer, parallel to the interior most surface of said device facing away from the viewer.

4. A display device as described in claim 2 or 3 wherein the location of the said linear polariser and said mosaic is interchanged.

5. A display device as described in claim 3, wherein said device is in two discrete parts, said linear polariser, at least one said electro-optical cell, means of generating a voltage or voltage waveforms being the first part, and the said mosaic screen and reflector being a second part, the viewer may view said second part through said first part.

6. A display device as described in claim 2, wherein said linear polariser, at least one said electro-optical cell, mosaic, screen, reflector if any, and means of generating a voltage or voltage waveform are formed as part of a projection device and a projection lamp is provided to illuminate the interior most side of the device in lieu of the light source.

7. A display device as described in claim 1, wherein the light source is an uniform incandescent, fluorescent or electro-luminescent source augmenting or substituting any external or natural light source, illuminating the interior most surface of said device.

8. A display device as described in claim 1 or 3 or 5 or 6 wherein said at least one cell comprising first and second cells which are capable of rotating the angle of the plane of polarisation of polarized light to any value in the range of at least from about zero to at least about 90 degrees, depending on the voltage applied thereto.

9. A display device as described in claim 8 wherein said second cell is capable of rotating the angle of polarisation of polarised light by at least from about zero to at least 90 degrees, depending on the voltage applied thereto, said second cell having interior and exterior surfaces parallel to those of the first cell, the two cells to produce an apparent rotation of the angle of polarisation by at least from about zero to at least about 180 degrees.

10. A display device as described in claim 8, wherein at least one said electro-optical cell is a liquid crystal cell.

11. A display device as described in claim 9 or 10 wherein at least one said electro-optical cell is selected from a group consisting of a twisted nematic, a supertwisted nematic, a double layer supertwisted nematic or a film compensated supertwisted nematic liquid crystal cell.

12. A display device as described in claim 8, wherein at least one said electro-optical cell is a ferroelectric cell.

13. A display device as described in claim 8, wherein at least one said electro-optical cell is a PLZT ceramic cell.

14. A display device as described in claim 8, wherein at least one said electro-optical cell is a thin-film iron garnet cell.

15. A display device as described in claim 10, wherein said mosaic of light polarising means is selected from a group of materials consisting of a polariser, dichroic, birefringent, dyed, chromatic, embossed, stretched or stress-patterned sheets or of a bonded together combination of some of said sheets.

16. A display device as described in claim 11, wherein said display device forms at least a part of a painting, sign, an advertising or exhibition display.

17. A display device as described in claim 5, wherein said display device is formed to animate printed material.

18. A display device as described in claim 11, wherein said display device is formed to be an instrument read-out indicator.

19. A display device as described in claim 11 wherein said display device forms at least a part of a toy or game.

* * * * *